July 3, 1962 E. LOEB 3,042,601
LIGHT WATER MODERATED NUCLEAR RESEARCH REACTOR
Filed Nov. 21, 1958 2 Sheets-Sheet 1

INVENTOR.
ERNEST LOEB
BY F. Friedrich Hamann
ATTORNEY

July 3, 1962  E. LOEB  3,042,601
LIGHT WATER MODERATED NUCLEAR RESEARCH REACTOR
Filed Nov. 21, 1958  2 Sheets-Sheet 2
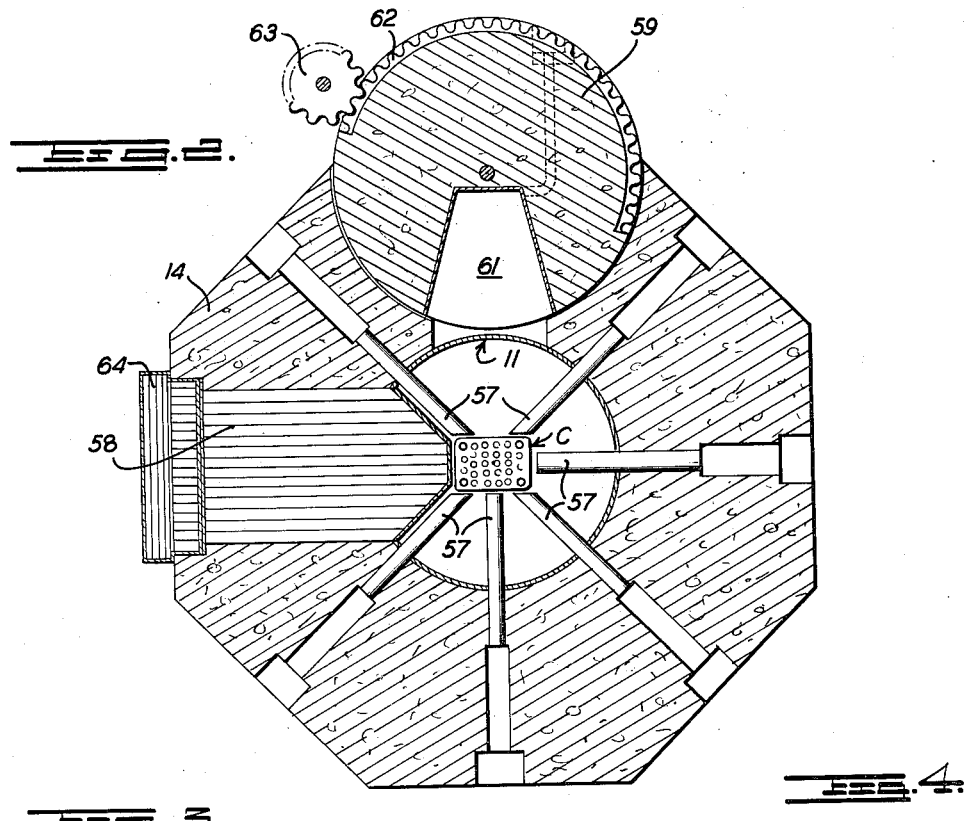
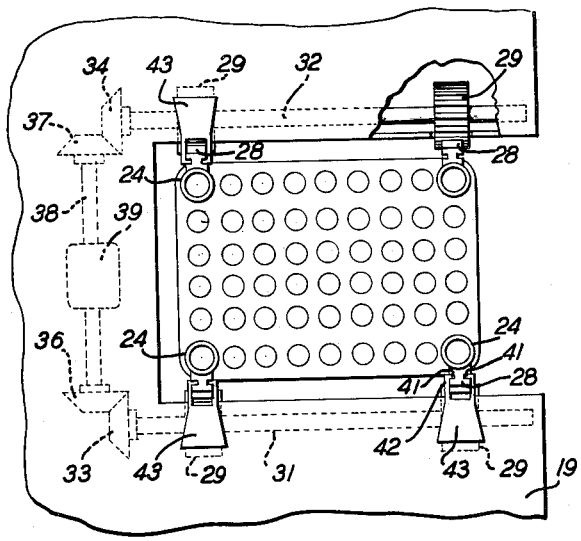
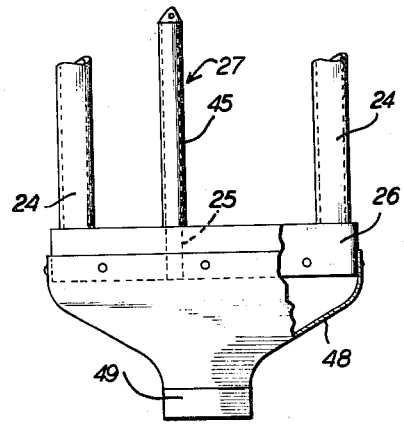
INVENTOR.
ERNEST LOEB
BY
ATTORNEY 3,042,601
LIGHT WATER MODERATED NUCLEAR
RESEARCH REACTOR
Ernest Loeb, Silver Spring, Md., assignor, by mesne assignments, to Allis-Chalmers Manufacturing Company, a corporation of Delaware
Filed Nov. 21, 1958, Ser. No. 775,494
3 Claims. (Cl. 204—193.2)

This invention relates to nuclear reactors and, more particularly, to research reactors in which light water is used as a coolant, moderator, shield and reflector.

Light water moderated research reactors can be subdivided into pool and tank reactors. In a pool reactor, the core is suspended from a movable bridge into an open pool of water. In a tank reactor, a stationary core is mounted within a closely fittting tank through which water is pumped to carry away the heat produced during operation. Reactors of these types are designed to produce copious supplies of neutrons and gamma rays for conducting research experiments, the radiations being used at the core of the reactor where they are produced or outside the reactor where they are led through special openings built into the reactor structure. In either case, it is generally desirable to have the highest possible flux. Because of their smaller cores, water-cooled and moderated reactors produce a much higher central flux than graphite moderated reactors of the same power and also provide a higher flux for outside experiments as the distance from the source of radiation to apparatus outside the shield is shorter.

An object of the present invention resides in the provision of a nuclear research reactor in which light water is employed as a coolant, moderator, shield and reflector.

Another object is to provide a nuclear reactor having a pool divided into a stall station and a bulk shield experiment station by means of a movable gate, and a tank station extending downwardly below the stall station.

A further object is to provide a research reactor in which the stall and tank sections are each provided with experimental facilities, and the core is movable to either of said stations for performing irradiation experiments.

Another object is to provide bridge means for moving the reactor core vertically between the stall and tank sections, and horizontally between the stall and bulk shield stations.

Another object of the invention resides in the provision of means for circulating cooling water through the core when the latter is positioned in either the stall or tank sections.

Another object is to provide a rotatable test cell facility adajcent the tank station for conducting dry irradiation experiments.

Another object is to provide a reactor in which a core grid is suspended from a bridge by means of tubular members adapted to serve as guides, rabbit tubes, irradiation facilities, through facilities, or as containers for reflector elements, or ion chambers.

The invention embodies other novel features, details of construction and arrangement of parts which are hereinafter set forth in the specification and claims and illustrated in the accompanying drawings, forming part thereof, wherein:

FIG. 2 is a sectional view taken along the line 2—2 of FIG. 1.

FIG. 3 is a fragmentary view taken along line 3—3 of FIG. 1.

FIG. 4 is a fragmentary side elevation showing the reactor core.

Figure 1:
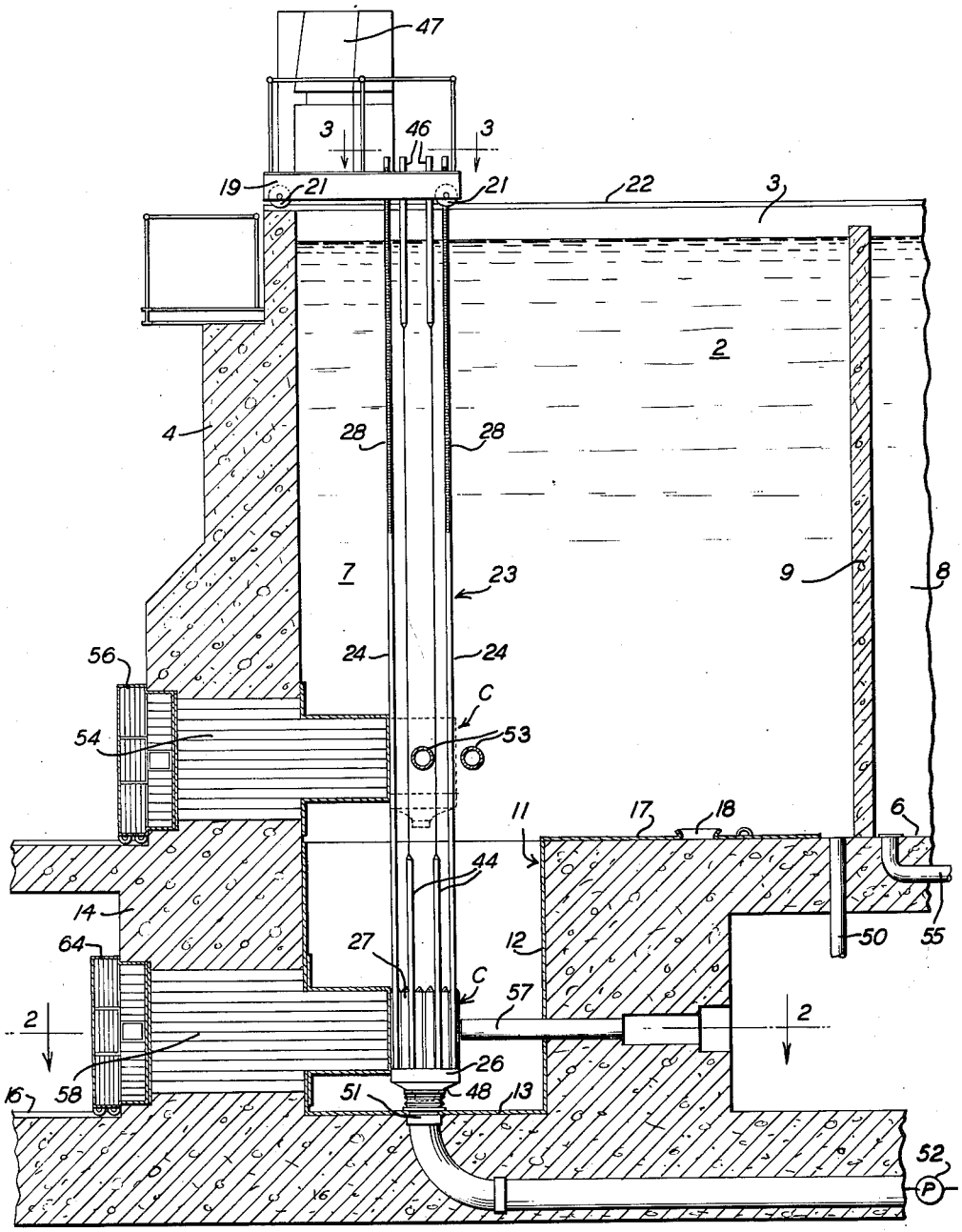
FIG. 1 is a fragmentary vertical section illustrating a nuclear research reactor embodying features of the invention.

Referring now to the drawings for a better understanding of the invention, the research reactor is shown in the form of a concrete swimming pool 2 having side walls 3—3, end walls 4—4, and a bottom 6. The pool is divided into a stall section 7 and a bulk shield section 8 by means of a movable gate 9 which is guided for vertical movement in grooves provided in the side walls 3—3.

An aluminum tank 11, having a cylindrical side wall 12 and a bottom 13, extends downwardly through the pool bottom 6 below the stall section 7 and is enclosed within an annular concrete biological shield 14 mounted on a concrete main floor 16. A cover 17 is slidably mounted on the pool bottom 6 for movement into position over the upper end of the tank 11, the cover being provided with a circular aperture 18 for alignment with the vertical axis of the tank.

A bridge 19 has flanged wheels 21 journaled thereon for movement along rails 22—22 mounted on the side walls 3—3. A tower structure 23 depends from the bridge 19 and is shown as comprising four aluminum tubes 24 secured to the corners of a grid 26 formed with vertical ports 25 to receive tubular fuel elements 27. Racks 28 are secured to the tubes 24 for meshing engagement with pinions 29 which are secured to the respective shafts 31 and 32. The shafts 31 and 32 are journaled in suitable bearings provided on the bridge 19 and provided with bevel gears 33 and 34, respectively, for engagement by gears 36 and 37, respectively, fixed on a drive shaft 38. The drive shaft 38 is journaled in bearings provided on the bridge and driven by a reversible electric motor 39. Grooves 41 are formed in the sides of the racks 28 to receive fingers 42 provided on guide brackets 43 secured to the bridge 19.

A plurality of control rods 44 extend downwardly between the fuel elements 27 and are raised or lowered by suitable drive mechanisms 46 mounted on the bridge to control the fission rate in the reactor. A console 47 is provided on the bridge 19 to house the instrumentation for control of the reactor. The fuel elements 27 may be of the MTR type comprising a tubular housing 45 containing a plurality of spaced uranium-aluminum alloy fuel plates suitably enriched with U-235.

A tubular header 48 is mounted on the grid 26 to collect water passing downwardly through the fuel elements, the header having a circular outlet 49 for registry with either the aperture 18 in the cover 17, or with the discharge means shown as an outlet conduit 51 leading to a pump 52 and a decay tank. Water is delivered to the pool through inlet means shown as conduits 50 and 55.

The side and end walls defining the stall section 7 are formed with openings to receive beam tubes 53 and a graphite thermal column 54 provided with a removable door 56. The tank 11 and annular shield 14 are formed with radial openings to receive beam tubes 57, a graphite thermal column 58, and a concrete test cell block 59 journaled for rotation about a vertical axis, the block being formed with a cell 61 to receive samples for dry irradiation experiments. A gear segment 62 is secured to the block 59 for engagement by a motor driven pinion 63 to rotate the block approximately 180° to and from its position shown in the drawing to load or unload the cell 61. The thermal column 58 is provided with a removable door 64.

In the operation of the research reactor thus shown and described, the core C of fuel elements may be positioned within the tank 11 with the header 48 in engagement with the outlet conduit 51 for forced circulation of water downwardly through the fuel elements during high power operation of, for example, 1000 to 5000 kw. It will be noted that an open experimental area extends 360° around the annular shield 14 to provide access to all facilities extending radially therethrough from the core C.

When the reactor is to be operated at a power range up to, for example, 1000 kw., the core C may be raised to its stall position, as illustrated in phantom outline in FIG. 1. In this position, the cover 17, if necessary, may be moved over the tank to align the port 18 in registry with the header outlet 49 to provide forced circulation through the fuel elements.

For conducting bulk shield experiments, the bridge 19 and core may be moved horizontally from the stall position toward or into the bulk shield section 8 of the pool. The bulk shield section may be provided with conventional gamma facilities and fuel element racks.

It will be noted that the tubular members 24 may serve as containers for reflector elements or ion chambers, or they may be employed as irradiation facilities in conducting some experiments.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. In a pool type research reactor, a pool having a tank depending from the bottom of said pool, said tank communicating with said pool, said tank having discharge means defined therein, at least one irradiation station in each said pool and said tank, a nuclear core within said pool, said core having a header attached thereto, means to selectively move said core into operating position at one of said stations, connecting means for connecting said header to said discharge means when said core is operably disposed at each of said stations, and circulating means disposed exterior to said tank and connected to said discharge means to forcibly circulate pool water through said core during operation of said reactor, said connecting means comprising coupling means coupling said header to said discharge means when said core is disposed at said tank station and a removable cover having an aperture defined therethrough for said tank, said aperture in said cover cooperating with said header when said core is disposed at said pool station.

2. A pool type nuclear reactor comprising: a pool; coolant in said pool; inlet means for said pool; a nuclear core submerged in said coolant and selectively movable between spaced first and second irradiation stations; a header attached to the lowermost portion of said core, said header having a circular outlet defined therein; irradiation facilities adjacent each of said irradiation stations; a tank extending downwardly through said pool bottom, said tank bottom having discharge means defined therethrough and connected to a discharge conduit, said discharge means adapted to receive said header outlet, said discharge conduit incorporating pumping means therewith to forcibly circulate coolant therethrough; a removable cover for said tank, said cover being slidably mounted on said pool bottom, said cover having an aperture defined therein to receive and register with said header outlet, said first irradiation station formed when said tank cover is removed and said core is disposed in said tank having said core header cooperating with said tank discharge means and said second irradiation station formed when said cover is placed over said tank, and said core header cooperates with said cover aperture thereby permitting said pumping means in said discharge conduit to forcibly circulate coolant through said core when said core is disposed at each of said stations.

3. In a light water moderated nuclear research reactor, a swimming pool having side walls, end walls, and a bottom, said pool having inlet means defined therein, at least one irradiation station disposed in said pool, a tank extending downwardly through said bottom at one end of the pool, at least one irradiation station disposed in said tank, and an annular shield extending around said tank discharge means connected to said tank a reactor core comprising a grid having ports therethrough, tubular fuel elements in said ports, a header mounted on said grid to receive water passing through said ports, conduit means disposed exterior to said reactor and connected to said discharge means, pumping means associated with said conduit means for forcibly circulating cooling water through said tubular fuel elements, said header receivable by said discharge means when said core is disposed in said tank irradiation station, a removable cover mounted on said tank having an aperture defined therein to receive said header during use of said core at said pool station, whereby a forced circulation of water is provided through said tubular fuel elements at each of said irradiation stations, means operable to selectively move said core to one of said stations, and two spaced groups of irradiation facilities, one group being in said tank adjacent said tank station and the other group being in said pool, adjacent said pool station.

References Cited in the file of this patent

UNITED STATES PATENTS

| | | |
|---|---|---|
| 2,743,224 | Ohlinger | Apr. 24, 1956 |
| 2,857,324 | DeBoisblanc et al. | Oct. 21, 1958 |

OTHER REFERENCES

Nucleonics, vol. 10, No. 11, Nov. 1952, pp. 56–60.

AEC Publication: TID–5275, Research Reactors, Aug. 1955, pp. 88–95, 152–158, 256–266.

NRL Report 4729, Naval Research Laboratory Research Reactor, May 24, 1956, Naval Research Lab., Wash., D.C., pp. IV and 1–9.